(12) United States Patent
Saastamoinen et al.

(10) Patent No.: US 9,045,861 B2
(45) Date of Patent: Jun. 2, 2015

(54) MANUFACTURE AND USE OF A COMPOSITE STRUCTURE CONTAINING PRECIPITATED CARBONATE

(71) Applicant: NORDKALK OY AB, Pargas (FI)

(72) Inventors: Sakari Saastamoinen, Hameenlinna (FI); Teemu Gronblom, Pargas (FI); Lars Gronroos, Pargas (FI)

(73) Assignee: Nordkalk OY AB, Pargas (FI)

( * ) Notice: Subject to any disclaimer, the term of this patent is extended or adjusted under 35 U.S.C. 154(b) by 0 days.

(21) Appl. No.: 13/798,883

(22) Filed: Mar. 13, 2013

(65) Prior Publication Data

US 2013/0312925 A1 Nov. 28, 2013

(30) Foreign Application Priority Data

May 28, 2012 (FI) .................................... 20125569

(51) Int. Cl.
*D21H 17/28* (2006.01)
*D21H 17/24* (2006.01)
*D21H 17/70* (2006.01)
*D21H 19/38* (2006.01)

(52) U.S. Cl.
CPC ............... *D21H 17/28* (2013.01); *D21H 17/24* (2013.01); *D21H 17/70* (2013.01); *D21H 19/38* (2013.01)

(58) Field of Classification Search
CPC ............................... D21H 17/21; D21H 17/28
USPC .................................................. 162/175, 181
See application file for complete search history.

(56) References Cited

U.S. PATENT DOCUMENTS

| 4,115,187 | A | | 9/1978 | Davidson |
| 4,178,205 | A | | 12/1979 | Wessling et al. |
| 4,187,142 | A | | 2/1980 | Pickelman et al. |
| 4,189,345 | A | | 2/1980 | Foster et al. |
| 4,225,383 | A | | 9/1980 | McReynolds |
| 4,445,970 | A | | 5/1984 | Post et al. |
| 4,710,270 | A | | 12/1987 | Sunden et al. |
| 4,799,964 | A | | 1/1989 | Harvey et al. |
| 4,982,590 | A | * | 1/1991 | Yoshida .......................... 72/235 |
| 5,514,212 | A | | 5/1996 | Kurrle |
| 5,830,364 | A | | 11/1998 | Bleakley |
| 6,294,143 | B1 | | 9/2001 | Deutsch et al. |
| 6,378,212 | B1 | * | 4/2002 | Belew ............................ 30/101 |
| 7,074,845 | B2 | | 7/2006 | Laleg |

(Continued)

FOREIGN PATENT DOCUMENTS

| GB | 1 505 641 | | 3/1978 |
| GB | 2 016 498 | A | 9/1979 |
| WO | 2011042607 | A1 | 4/2011 |

OTHER PUBLICATIONS

Finnish Search Report for 20125746 dated Apr. 24, 2013.

*Primary Examiner* — Jacob Thomas Minskey
(74) *Attorney, Agent, or Firm* — McCormick, Paulding & Huber LLP (57) ABSTRACT

A precipitated carbonate polysaccharide structure which, when used as a filler, improves the structural strength of paper or board, or gypsum boards, plastics or gums, among others, as well as the stiffness level and optical properties (brightness and opacity) of the paper or board, together or separately with other fillers; carbonates, in particular. The invention further improves the setting of printing ink on the surface of the paper or board. The invention also includes the manufacturing method of the precipitated carbonate polysaccharide structure.

18 Claims, 5 Drawing Sheets

(56) References Cited

U.S. PATENT DOCUMENTS

| | | |
|---|---|---|
| 8,025,768 B2 | 9/2011 | Laleg et al. |
| 2002/0100564 A1 | 8/2002 | Harvey et al. |
| 2003/0188738 A1 | 10/2003 | Laleg |
| 2005/0252629 A1 | 11/2005 | Laleg |
| 2007/0101904 A1 | 5/2007 | Peltonen et al. |
| 2007/0163737 A1 | 7/2007 | Johansson et al. |
| 2008/0087396 A1 | 4/2008 | Deng et al. |
| 2008/0264586 A1 | 10/2008 | Likitalo et al. |
| 2008/0265222 A1* | 10/2008 | Ozersky et al. ............... 252/607 |
| 2009/0114352 A1* | 5/2009 | Rossi ............................. 162/29 |
| 2009/0126891 A1 | 5/2009 | Koivunen et al. |
| 2009/0255441 A1 | 10/2009 | Mikkonen et al. |
| 2010/0078138 A1 | 4/2010 | Laleg |
| 2010/0179248 A1 | 7/2010 | Esser et al. |
| 2010/0181037 A1 | 7/2010 | Esser et al. |
| 2010/0181038 A1 | 7/2010 | Esser et al. |
| 2014/0004340 A1 | 1/2014 | Saastamoinen et al. |

* cited by examiner

MANUFACTURE AND USE OF A COMPOSITE STRUCTURE CONTAINING PRECIPITATED CARBONATE

CROSS REFERENCE TO RELATED APPLICATIONS

This application is entitled to the benefit of and incorporates by reference essential subject matter disclosed in Finnish Patent Application No. 20125569 filed May 28, 2012.

TECHNICAL FIELD

The present invention relates to a composite structure having a polysaccharide body, and a surface including precipitated carbonate. In particular, the invention relates to a type of carbonate polysaccharide structure, which is manufactured in the process of a paper or board mill, in connection with the cooking of starch or the dilution of cooked starch, the forming of nanocellulose or cold-soluble starch, especially to constitute the filler of a paper or board product. This structure increases the strength, opacity, and brightness of the finished paper or board, and the optical density of the ink. For the effective precipitation of carbonate, it may be possible to exploit the optimization of pH.

BACKGROUND

Typically, the fillers or pigments that are used in the manufacture of paper and board have an average diameter of less than 5 µm and have a light colour. The most typical fillers include kaolins, talcs, ground calcium carbonate (GCC), and precipitated calcium carbonate (PCC). In addition, there are more expensive special pigments, such as precipitated aluminium silicates, satin white, and titanium dioxide. The drawing of an exact line between fillers and coating pigments is difficult; however, roughly speaking, fillers have a coarser size than pigments, which are used in coating. From the point of view of maximum light scattering, in theory, an optimal particle size for the most common fillers and coating pigments is about 0.4-0.5 µm. Typically, the average particle size of coating pigments is 0.5-1 µm and that of fillers is 1.5-4 µm. In this application, these concepts are, hence, not distinguished, but pigments and fillers are jointly called the filler. In the manufacture of paper and board, fillers are preferably used, because they replace more expensive fibres, and improve the optical properties and the setting of printing ink (the printability). Using them, the basis weight of paper or board can also be reduced, whereby the same weight provides an increased printing or packing surface without the quality suffering.

The greatest disadvantage of using fillers and pigments, as well as other fillers, is the weakening of the dry strength of the paper or board structure, when the chemical mass is replaced with filler, in particular. This is due to the fact that fillers prevent the formation of hydrogen bonds between the fibres, by attaching themselves to the surface of the fibres. Calcium carbonates, both ground (GCC) and precipitated (PCC), however, are widely used, because of their low price and good light scattering properties, in replacing chemical pulp fibre, in particular. Certainly, paper and board, which are manufactured from recycled, de-inked and mechanical pulps, could be replaced with calcium carbonates, but the alkali darkening of mechanical pulp often limits their use in the manufacture of the paper and board grades that are manufactured from these pulps. The decrease in strength and stiffness of the paper or board product, when the fibre is replaced with filler, is mainly due to the fact that fillers weaken the formation of hydrogen bonds between the fibres, since the surface of the fillers does not form hydrogen bonds. In the same basis weight, an increase in the filler content causes an increase in the density of the paper and a decrease in the thickness of the paper. The latter causes a decrease in the stiffness of the paper or board. At present, filler is normally added directly to the pulp. In the wire section, only part of the added filler is attached to the finished paper or board web. The reminder of the filler travels through the white water system to finally constitute part of the paper or board structure. Part of the filler of the white water system, finally, also burdens the sewage treatment plant, since not all of the material is ever carried out of the process along with the finished paper or board. The weaker fibre-fibre bonds that are caused by the filler on the surface of the paper or board may also result in an increase in the dust formation of the surface in printing, when the surface strength weakens.

Precipitated calcium carbonates (PCC) can be manufactured in separate factories, whereby the finished PCC is delivered to the customer as slurry or a dry product. At the present time, however, PCC factories are generally built close to paper or board mills, whereby PCC is delivered in a form of slurry, through a pipe, to the storage container of the customer. One advantage of these "on-site factories" is that, in the precipitation of PCC, the carbon dioxide that is released in the manufacturing process of chemical pulp can then be exploited.

It is typical of these precipitation processes of PCC that the pH is reduced from the alkaline range to the neutral one (typically, pH of 7-8.5), by decreasing the pH of an alkaline $Ca(OH)_2$ solution by an acidic $CO_2$. In recent years, manufacturing processes have been launched on the market, precipitating PCC directly to the fibre slush at the paper or board mill. These precipitation processes often employ an intensive agitation or injection pressure when admixing $Ca(OH)_2$ and $CO_2$ to the fibres. In this case, the precipitation pH typically lowers from alkaline to the neutral range (pH 7-8.5), or it is kept essentially neutral by changing the mutual dosages of $Ca(OH)_2$ and $CO_2$. Thus, it is common to the processes mentioned above that the pH in the carbonate solution is alkaline before the precipitation, whereby they are not suitable to be used as part of the manufacture of paper or board.

Dry strength is a structural property of paper or board, which mainly develops when the dry matter content of a wet fibre network increases, when water is removed from the fibre slush by filtering, pressing, and drying. The strength of the finished paper and board consists in the strength of single fibres, the bonds between the fibres, the number of the bonds, and the distribution of the bonds and fibres in the fibre network. The distribution is essentially influenced by formation.

Various forces influence the strength of the fibre network; the most important of these comprises hydrogen bonds, even though covalent bonds, ionic bonds, and van der Waals forces have a specific effect on the strength of the network. The number of hydrogen bonds is large, and they act close to the surfaces of the fibres.

Dry strength agents enhance the strength of other properties in the network, but they do not influence the strength of single fibres. It is a known fact to also mechanically increase the strength of the fibre network by grinding the fibres in water. In that case, the number of micro-fibrils on the fibre surfaces grows, increasing the number of fibre bonds and distributing the fibres more evenly.

The strength of the paper or board can be increased by increasing the portion of long fibre in the fibre composition, decreasing the amount of filler that is used, or adding a dry strength agent to the fibre slush. The process changes that can be used to strengthen the fibre network include raising the pH of the wet section (from acidic to neutral), an improved formation, and a stronger wet pressing in the press section.

Grinding the fibre slush, however, is the most typical way of increasing the dry strength of paper or board. Apart from an increase in the energy consumption, the negative effects of grinding include an increase in the density of the finished paper or board, and a decrease in the porosity, stiffness, and tearing strength. Typically, the opacity also decreases along with the grinding of fibre slush.

Due to these adverse effects of the fibre slush grinding, it is normal to use dry strength agents. Typically, the dry strength agents are water-soluble, hydrophilic polymers that are either natural or synthetic products. The best commercial products comprise starch, vegetable gums, carboxy-methyl cellulose, and, regarding synthetic polymers, polyacrylamide and glyoxylated polyacrylamide, in particular.

All plants contain starch. Starch is commercially produced from potato, tapioca, barley, wheat, rice, and corn, however. Waxy maize is a starch that is refined in the United States, fully consisting of amylopectin. Waxy maize is used instead of potato starch, in particular.

Starch belongs to polysaccharides. Starch is a glucose polymer, wherein the anhydroglucose units are bonded to each other by a 1,4-$\alpha$-D-glucosidic bond. The glucose chains are either straight (amylose) or branched (amylopectin). Normally, the amount of amylose in starch is smaller. In plants, starch is found in small (2-150 μm) granules that are separated in the manufacturing process.

The ability of starch to attach to the fibre network is caused by its large number of hydroxyl groups, which increase its ability to form hydrogen bonds. The hydroxyl groups also bind hydrogen molecules to themselves. In the drying of paper or board, water evaporates and hydrogen bonds are formed between starch and the fibres.

Generally, starch does not dissolve in cold water. This is due to the fact that the starch polymers are in a well-organized form, bound by the hydrogen bonds in the starch granules. When an aqueous starch solution is heated, the starch granules swell first, after which, single starch polymers are released from each other.

Starch is often treated to make the starch cationic, the stability of the solution is increased and/or its rheological properties are improved at higher dry matter contents. Being a polyol, the chemical treatment products of starch are generally ethers or esters. These treatment alternatives include hydroxy-alkylation, cationization, carboxymethylation, acetylation, thermo-mechanical treatment, enzyme treatment, hydrogen peroxide treatment, sodium hypochlorite treatment, and acid treatment. Starches that dissolve in cold water, so-called cold-soluble starches, can also be provided by treating the starch.

After fibres and fillers, starch is a raw material that is used the most in the manufacture of paper and board. In addition to the improvement of dry strength in the paper and board manufacture, starch is used as a retention agent, for the dispersion of stock sizes, in fixatives, as a spray starch, in surface sizing, and in coating.

Native (untreated) starch is anionic and, therefore, its attachment to the fibre in the paper and board manufacturing process without a cationic treatment is poor. At present, cationic starches are ethers that are manufactured using an epoxy chemical that contains a quaternary ammonium group. The cationization considerably improves the attachment of starch polymers to the fibres. Like cationization, other treatments of starch can also be carried out for dry starch granules or starch granule slurry.

In the paper and board manufacturing process, typically, about one third of the starch is adsorbed on the surface of long fibres. This is equivalent to about 70% of the total solid matter content in the fibre, the remainder being divided evenly between the fines and the filler. A high adsorption of starch on the fines and filler results in a weakened strength. The best effect of the increase in strength of starch is achieved, when it attaches to the long fibres. In the paper and board manufacturing process, this is generally the purpose of dosing starch into high consistency pulp. When dosed into dilute pulp, close to the head box, starch (mainly cationic) improves the retention and dewatering—not so much the strength. The use of starch in surface sizing does not result in an equally effective improvement of strength as when added to high consistency pulp.

The main purpose of pulp starch is to improve the dry strength of the paper or board. Starch improves the strength and tensile strength of the paper and board in the Z direction, in particular. The use of pulp starch also considerably improves the bursting strength that is of importance to the manufacturers of board and corrugated board. When starch is added to high consistency pulp to increase the strength, normally, 4-10 kg/t of starch is used. Generally, increasing the amount of addition does not considerably increase the strength properties, but weakens the dewatering of the wire section, among others, even though as much as 40 kg/t of additions have been reported. This is due to the fact that when the anionic charge of the fibres and the filler is neutralized with cationic starch, the rest of the starch no longer attaches to the fibres and the filler, but remains as dissolved starch in the circulation waters.

Typically, the starch polymers inside the starch granules should either be released by adding them to hot water or cooking the aqueous starch solution. An exception to this is constituted by the cold-soluble starches mentioned above. At present, a continuous jet cooker is the most typical method of cooking the starch. In the jet cooker, starch slurry is pumped through the cooker, while the cooker is heated with high-pressure steam. The maximum dry matter content of the starch solution in the jet cooker can be over 10% and the temperature is about 125-135° C. The cooking time is 2-4 minutes. A suitable storage temperature for cooked starch is 60-80° C. In batch cooking, starch is typically heated in a 5% solution to 95° C. with direct steam, and the cooking time is 20-30 minutes. When dosed into the paper or board machine, starch is diluted to 1% or weaker.

In addition to starch, other strength-improving additives have also been used. Guar gum is a vegetable gum that is used the most frequently. Guar gum and locust bean gum are seed gums and consist of galactomannan. Karaya gum has a more complex structure; it is a branched polysaccharide. The use of vegetable gums has been limited by their price that is higher than starch. They have also been more difficult to treat than starch. The additives that improve the dry strength, which are used the most, comprise cationic starches. The anionic charge of vegetable gums has enabled them to be used, to a minor degree, to prevent over-flocculation, improving the formation. Obviously, they then act as some kind of a protective colloid between the pulp components.

Carboxy-methyl cellulose (CMC) is water-soluble cellulose that is treated by carboxylation. The carboxyl content and the length of the molecular chain vary between different products. CMC improves the dry strength of paper and board similarly to starch, but its use in the applications of the wet section has been limited to special papers, mostly because of its high price. The carboxyl groups of CMC render it anionic;

therefore, when used in the wet section, another cationic additive should be used to attach the same.

Cellulose and nanocellulose also belong to polysaccharides. Nanocellulose or microfibrillated cellulose can be manufactured from all materials that contain cellulose, such as wood. The structure of nanocellulose is considerably smaller than that of a normal cellulose polymer; therefore, it contains a considerably larger number of hydroxyl groups that form hydrogen bonds. Cellulose that has been pre-treated with enzymes or carboxymethylation makes the manufacture of nanocellulose cheaper. At present, the manufacturing process requires high pressure and temperature, and high speed in the homogenizer; without the pre-treatment, the manufacturing costs are considerably higher.

Polyacrylamide (PAM) is the most frequently used synthetic polymer, which is used to improve the dry strength. PAM is long and straight-chain and it either has a cationic or anionic charge. Due to its high price, PAM is generally used as a retention agent, instead of trying to improve the dry strength. For the improvement of the dry strength of polyacrylamide, glyoxylated PAMs are also found on the market. Regarding other synthetic polymers, which can be used to improve the dry strength, polyvinyl alcohol and latex should be mentioned.

Historically, efforts have been made to solve the problem of reduced strength, which is caused by the addition of filler, by agglomerating single filler particles into larger agglomerates. Such patents include, among others, the U.S. Pat. Nos. 4,225,383; 4,115,187; 4,445,970; 5,514,212; and 4,710,270; and the GB patents 2,016,498 and 1,505,641. In these patents, anionic filler particles have typically been agglomerated into larger aggregates with a cationic additive in a mixture. In these patents, it has been observed that the strength properties and filler retention have improved, but at the same time, the optical properties have decreased.

There are also patents, wherein latexes are utilized to reduce the decrease in strength that is caused by the addition of fillers. Such patents include, among others, the U.S. Pat. Nos. 4,178,205; 4,189,345; 4,187,142; 4,710,270; and 7,074,845B2. The U.S. Pat. No. 4,799,964 and the U.S. Patent application Publication No. 20020100564 deal with the manufacture of a filler agglomerate, using starch as a binder. They prevent the decrease in strength that is due to the use of filler, but do not increase the strength, even though filler is used.

The U.S. Patent application Publication No. 20080087396 relates to a filler that is coated with starch, resulting in a lower decrease in strength than when untreated filler is used. The US Patent Publication Nos. 20100179248, 20050252629, 20030188738, 20100181038, 20100181037 and 20100078138, as well as the U.S. Pat. No. 8,025,768, respectively, deal with the treatment of filler with starch and/or latex to obtain a higher filler content in the paper or board, while the strength is better maintained. The end products obtained from these treatments are also filler agglomerates, as above.

The U.S. Patent applications Publication Nos. 20070101904, 20090255441, and 20070163737 relate to an organic filler or pigment, which is manufactured from starch and which does not reduce the strength of the manufactured paper or board at all, because organic starch strengthens the fibre network, contrary to the inorganic fillers and pigments that are commonly used. One challenge thereof, again, is the price that is higher than that of the fillers, which fully or partly consist of inorganic substances.

Consequently, there is a need for a fibre product, wherein the filler would attach to the fibre and fillers more effectively and, at the same time, would give the product advantageous strength properties that would preferably be further improved, compared to the known solutions.

SUMMARY

An object of the present invention is to provide a new filler that would be suitable for paper and board products, as well as plastics, gums, gypsum boards, and laminates, improving their strength.

Particularly, the purpose of the filler in question is to improve the strength, while specifically the brightness of the paper or board product and the optical density and opacity of the ink remain on a good level.

Another object of the present invention is to provide a new filler for the paper or board product that contains, as the filler, a carbonate composite that attaches to the gaps between the fibres.

The present invention thus relates to a composite structure that consists of polysaccharide and carbonate. This structure is suitable to be used as the filler of the applications mentioned above, among others. Also the manufacturing method of this structure falls within the scope of the invention.

To be more precise, the manufacturing method of the composite structure according to the present invention comprises steps of forming a carbonate ion solution; mixing polysaccharide, in a form having free hydroxyl groups on its surface, into the carbonate ion solution, whereby a carbonate polysaccharide slurry is formed; and precipitating carbonate salt from the slurry into the polysaccharide.

Correspondingly, the composite structure is formed of polysaccharide and carbonate wherein the body of the structure is made of polysaccharide, into which carbonate has been precipitated, and the composite structure is used as filler in the manufacture of paper or board, in plastics, gums, the manufacture of gypsum board or the manufacture of laminates that are made of Deco paper.

The present invention is multifunctional and improves various properties. The composite structure, according to the invention, provides, among others, an improvement of the strength properties of the products of various applications, compared with a situation, where a conventional additive is used to improve the dry strength.

In the case of fibre products, it is also possible to keep their important properties, such as brightness, opacity, and printability on a good level, while part of the fibres of the fibre product can be replaced with the filler.

In other products mentioned above, such as in the manufacture of gypsum boards and Deco papers, the composite structure according to the invention can provide, above all, improved strength properties, but also the printability and optical properties can be improved and expensive titanium oxide can be replaced, for example. This makes it possible to make the structure of the gypsum plates and Deco papers thinner without weakening the properties of the end product.

BRIEF DESCRIPTION OF THE DRAWINGS

The present invention and its advantages will now be described in further details with reference to the accompanying drawings where.

DETAILED DESCRIPTION

The present invention relates to a composite structure with a polysaccharide body, and a surface including precipitated carbonate.

As the polysaccharide, it is preferred to use carboxy-methyl cellulose, guar gum or nanocellulose or a mixture of any of the above, more preferably starch or nanocellulose, most suitably starch.

In the case of starch, its particles can be treated before using in the said composite structure, so that the particle is swollen, or even fully or partly broken. Generally, this is carried out by heating which, in the case of the present invention, can be carried out, for example, in a solution that contains carbonate ions and other states of carbonate, in a prevailing pH (i.e., in a so-called carbonate ion solution).

The carbonate, which is included in the composite structure and precipitated on the surface of the polysaccharide, is preferably calcium or magnesium carbonate or a mixture thereof, whereby the carbonate ion solution also contains calcium or magnesium ions or a mixture thereof.

At least part of the carbonate of the composite structure is precipitated directly on the surface of the polysaccharide from the solution. Optionally, part of the carbonate is comprised of added carbonate, which is preferably calcium carbonate, such as precipitated calcium carbonate (PCC) or ground calcium carbonate (GCC) or a mixture thereof, most suitably PCC. As much as half of the carbonate of the composite can consist of this added carbonate, however, preferably only 0-40% by weight of the total carbonate, more preferably 0-30% by weight.

Typically, the crystal structure of the precipitated calcium carbonates is calcite, aragonite, or vaterite. Calcite is typically found in crystal forms, such as flaky and cubic. Scalenohedral, rhombohedral, acicular, spherical, and prismatic crystal forms are also possible to obtain by changing the precipitation conditions, such as the concentration of slaked lime and the reaction temperature.

The present invention also relates to a method of producing such a composite structure, including the steps of
- forming a carbonate ion solution, preferably from calcium or magnesium ions or a mixture thereof, bicarbonate and other states of carbonate;
- admixing polysaccharide to the carbonate ion solution, whereby a slurry is provided; and
- precipitating carbonate into the polysaccharide from the solution.

According to an embodiment of the invention, the carbonate ion solution is produced from a hydroxide solution, preferably by reducing its pH to acidic (below 6.5); most preferably, by conveying carbon dioxide to the same. The hydroxide solution can be manufactured, for example, by elutriating in an aqueous solution, burnt lime, burnt dolomite, MgO or, possibly, another source of calcium or magnesium which, when elutriated in water, yields an alkaline solution, or a mixture of two or more of the above.

Particularly, when the polysaccharide is starch, it can either be treated before or after the formation of the carbonate slurry, so that the starch particles become swollen or partly or fully broken, whereby the starch polymers are partly or fully released and they can be utilized more effectively than before in forming the hydrogen bonds. The decomposition is generally caused by heating. Mere swelling can, generally, be effected by carrying out quick heating and, after that, quick cooling, whereby the starch particles swell, maintaining their shape.

According to a preferred embodiment, polysaccharide carbonate slurry is formed, in the method mentioned above, by diluting starch with the carbonate ion solution; whereafter the slurry that is thus formed is heated.

According to a second preferable embodiment, starch is heated in an aqueous solution that does not contain carbonate, such as pure water, whereafter the treated starch is diluted with the carbonate ion solution.

According to a third preferable embodiment, starch is heated in the hydroxide solution before the carbonate ions are formed from the hydroxide.

According to a fourth preferable embodiment, calcium carbonate is precipitated to cold-soluble starch from the hydroxide solution by means of low pressure, heating, agitation, the dosing of an alkali-bearing additive or the combination of any of the above.

In all of the preferable embodiments mentioned above, the heating is preferably carried out by batch cooking or by means of a jet cooker.

In the jet cooker, the dry matter content of the starch-bearing solution or slurry is, typically, kept on a level of about 10%. The temperature during the cooking is about 125-135° C. and the cooking time is 2-4 minutes. The cooking time can be adjusted, however, according to a desired end result (whether swollen or broken granules should be obtained from the starch). After the temperature has reached the gel point (a temperature of 62-80° C.), the viscosity strongly increases, until single starch polymers are released from each other and the viscosity decreases. In batch cooking, the starch is typically heated as a 5% solution to 95° C. with direct steam, and the cooking time is 20-30 minutes. A suitable storage temperature for the cooked starch is 60-80° C.

If the polysaccharide is selected from alternatives other than starch, no heating is needed, as those other materials do not need to be made swell and their polymer chains do not need to be detached by breaking the surface. In these embodiments, polysaccharide is preferably diluted with the carbonate ion solution or, optionally, hydroxide solution, in which the carbonate ions are formed after this; and carbonate is precipitated from the carbonate ion solution directly on the surface of the polysaccharide that is contained in the solution.

The precipitation of carbonate can be carried out by any conventional methods. According to an alternative, precipitated carbonate (PCC) is manufactured by changing the pH from alkaline toward neutral.

In the method of precipitation according to a second alternative, the pH is essentially kept in the pH range (pH 6.5-8) throughout the elutriation and precipitation.

A third alternative, however, constitutes a preferable embodiment of the invention, wherein the carbonate is precipitated so that     the pH of the carbonate ion solution is adjusted to a value below 6.5, before the polysaccharide is admixed to the solution; and     the pH of the thus formed slurry is adjusted to over 6.5, preferably to over 6.7, whereby carbon dioxide is released and the carbonate precipitates on the surface of the polysaccharide.

The pH values above are considered to include margins of error, which are at least ±0.2 but, according to the accuracy of the measuring instrument and, particularly, when the method is implemented in a flowing solution or by continuously adding a reagent, the margin of error may even be higher.

The adjustment of pH to a lower value is preferably carried out by conveying carbon dioxide to the solution. This can be carried out, for example, at the same time as the carbonate ion solution is formed from the hydroxide solution, according to an embodiment mentioned above. Correspondingly, the adjustment of pH to a higher value is preferably carried out by means of heating, the dosing of an additive that contains alkaline additives, low pressure, agitation or a combination of these.

When the polysaccharide is starch, the adjustment of the pH to over 6.5 is most suitably carried out in connection with the cooking of the starch or the dilution of the cooked starch.

The term "carbonate ion solution" refers to a carbonate system that can contain carbonate ions ($CO_3^{2-}$), bicarbonate ions ($HCO_3^-$), carbonic acid ($H_2CO_3$), and even carbon dioxide ($CO_2$), but this content and the mutual ratios of these states vary according to the pH of the solution.

The carbonate system, thus, refers to the change of different carbonate states, according to the pH. The main states of carbonate are:

$$H_2CO_3 \leftrightarrow HCO_3^- \leftrightarrow CO_3^{2-}$$

At an acidic pH, soluble carbon dioxide ($CO_2$) and, to a minor extent, carbonic acid ($H_2CO_3$), are the main states of carbonate. In the neutral (on both sides of a pH of 7) and alkaline ranges, bicarbonate or hydrocarbonate ($HCO_3^-$) is the main state of carbonate up to a pH of about 10. In a highly alkaline range (pH >10), carbonate ($CO_3^{2-}$) is the main state. The alkalinity of carbonates refers to the amount of strong acid, with which the aqueous solution can be titrated to the end point of phenolphthalein. At that time, all of the $CO_3^{2-}$ has been converted into the ion state $HCO_3$—. This takes place at a pH of about 8.3. In the most important pH range of the paper and board manufacturing process, the pH of 6-8, bicarbonate ($HCO_3^-$) is the predominant state. Furthermore, reasonably well dissolved carbon dioxide and some carbonic acid and colloidal carbonate have come to this pH range from the acidic range of the pH range. The solution in the acidic pH range (pH <6) is herein called the acidic carbonate ion solution.

By increasing the pH or the temperature, bicarbonate ions can be converted into carbonate particles from the carbonate ion solution. Correspondingly, when the temperature is raised, carbon dioxide is released and the bicarbonate reacts with free calcium or magnesium ions, according to the following reaction equation:

$$Ca^{2+}+2HCO_3^- \rightarrow CaCO3\downarrow+CO2\uparrow+H_2O\uparrow.$$

The reaction above also works, when a sufficiently warm carbonate ion solution is subjected to low pressure or centrifugal force, so that the carbon dioxide is released in the air from the solution.

When the pH is increased with an alkali, e.g., NaOH or Ca(OH)$_2$, the carbonate particles can be precipitated according to the following reaction equations:

$$Ca^{2+}+2HCO_3^-+2NaOH \rightarrow CaCO3\downarrow+Na_2CO_3+2H_2O.$$

$$Ca^{2+}+2HCO_3^-+Ca(OH)_2 \rightarrow 2CaCO3\downarrow+2OH^-.$$

The bicarbonate in the acidic carbonate ion solution is assumed to help the thus generated carbonate filler to attach to the polysaccharide polymer. The bicarbonate ion, as such, includes a possibility for the formation of hydrogen bonds, which is important for the attachment of polysaccharides to the fibre, among others. It could be considered that bicarbonate controls the attachment to the hydroxyl groups of the polysaccharides before precipitating into carbonate.

When polysaccharide that is treated by cationization is used, it is probable that, in the invention, the cationic groups help the generated carbonate polysaccharide structure to attach to the fibre. Due to these reasons, the carbonate filler is capable of enhancing the strength bonds between the hydroxyl groups of the dry strength polymer and the groups of the fibre that form hydrogen bonds.

As mentioned above, the polysaccharide can be, for example starch, carboxy-methyl cellulose, guar gum or nanocellulose or a mixture of any of the above, preferably starch or nanocellulose, most suitably starch.

Amphoteric starches function in a wider pH range than cationic starches. Hence, they are advantageous polysaccharides to be used in the present invention. Anionic starches can be used in very acidic, cationic mass systems or as the anionic component of a two-component retention system, whereby they are advantageous to be used in the embodiments of the invention that exploit acidity.

Other ways of treating starch include hydroxy-alkylation, cationization, carboxymethylation, acetylation, thermo-mechanical treatment, enzyme treatment, hydrogen peroxide treatment, sodium hypochlorite treatment, and acid treatment.

Vegetable gums are more difficult to treat than starch. Correspondingly, polyacrylamide (PAM), nanocellulose, and carboxy-methylcellulose (CMC) do not need to be treated, as the former is already found in either a cationic or anionic form, and the latter and the last already contain a sufficient number of hydroxyl groups that form hydrogen bonds. Consequently, in their untreated form, they are well suited to be used as polysaccharides in the invention.

The applications of the above-mentioned composite structure, according to the invention, can comprise the manufacture of paper or board, plastics, gums, the manufacture of gypsum board, or the manufacture of laminates that are made of Deco paper. In that case, the composite structure generally functions as a filler in the end product.

In paper or board products or other similar fibre products, the composite structure is preferably dosed into the pulp, optionally, together with ground calcium carbonate (GCC), precipitated calcium carbonate (PCC), kaolin agglomerates, carbonate agglomerates, kaolin carbonate agglomerates or a mixture of any of the above.

Most suitably, the composite structure is dosed in the paper or board machine, either into high-consistency or dilute pulp before the paper or board is formed in the wire section.

The fibre product that is manufactured can be printing paper, packing board, tissue paper, kraft paper or another paper grade that employs mechanical pulp or chemical pulp fibre.

In the present invention, it has thus been proven that, by raising the pH of the carbonate ion solution, which is at an acidic pH, to the neutral range, when the polysaccharide is in the acidic carbonate ion solution (pH >6.5), by means of heating, the dosing of an additive that contains alkaline additives, low pressure, agitation or a combination of any or all of the above, carbonate can be precipitated on the surface structure of the polysaccharide. Additionally, it is possible to use any known additives, such as acids that influence the crystal form and structure of the precipitated carbonate. In the manufacture of paper or board, in addition to opacity, brightness, and printability (an improvement in the absorption properties of the ink), this composite structure of precipitated carbonate and polysaccharide gives the end product an improvement in strength, above all.

Apart from being reduced, the decrease in strength is also converted into an increase in strength, in specific cases, when the filler is used. The strength can be on a better level than when the paper or board is manufactured without the filler (such as carbonate), but together with starch that improves the dry strength. The increase in the pH of the carbonate ion solution that is at an acidic pH is based on the release of carbon dioxide. This is of particular advantage in the paper and board mills, where there is free carbon dioxide capacity, which is obtained from a pulp mill, available for the manufacture of the acidic bicarbonate ion solution.

Typically, before dosing into the filler, the carbonate polysaccharide composite, according to the invention, is manufactured according to the following alternatives, for example, in the paper or board manufacturing process:

A) In the cooking of starch, the acidic carbonate ion solution is used as cooking water, whereby untreated starch granules are mixed with the carbonate ion solution, whereafter the cooking is carried out in the manner defined above. The purpose of cooking the starch granules is to break the shape of the granules, whereby starch polymers are released. During the cooking, the pH of the acidic carbonate ion solution rises to an alkaline or neutral level, whereby the carbonate precipitates on the surface structure of the starch from the carbonate ion solution, and the carbonate starch composite, according to the invention, is generated. The starch is preferably selected so that the increase in pH takes place when the granules break. The starch can also be admixed to a carbonate ion solution that is already heated, i.e., directly without cooking, in the mixture. In connection with the addition of the hot solution or water, or with the cooking stage, an alkaline additive can be added separately. The alkaline additive can be, among others, PCC, GCC or calcium hydroxide.

B) Starch is cooked separately, as defined above, and the treated starch is thereafter diluted with the acidic carbonate ion solution. The carbonate ion solution and starch are mixed by using a sufficiently effective agitation. The carbonate ion solution can be heated or unheated. The alkaline additive can be separately added to the dilution. The alkaline additive can be, among others, PCC, GCC or calcium hydroxide.

C) In the cooking of starch, the acidic carbonate ion solution is used as cooking water. The cooking is carried out quickly (in jet cooking, in about 2 minutes, and in batch cooking, in about 20 minutes), whereafter the cooking solution is cooled. The purpose of cooking the starch granules herein is to maintain the shape of the granules, whereby some starch polymers also remain inside the granules. In that case, the granules only swell. During the cooking, the pH of the acidic carbonate ion solution rises to a neutral or alkaline level, whereby carbonate precipitates on the surface structure of the starch from the carbonate ion solution, and the carbonate starch composite, according to the invention, is generated. The starch can also be admixed to a hot carbonate ion solution. An alkaline additive can be added separately to the addition of the hot solution or water, or to the cooking stage. The alkaline additive can be, among others, PCC, GCC or calcium hydroxide. It is essential that the heating is stopped and the slurry cooled before the granules loose their shape. In the case of the paper or board product, the increase in strength is provided when the paper or board is dried, whereby the starch polymers of the granules are released together with the precipitated carbonate.

D) The finished carbonate filler, such as PCC or GCC, is added to the cooking of starch together with the carbonate ion solution, according to the invention, and the starch granules are partly of fully broken during the cooking described above.

E) During the cooking of starch, a hydroxide solution (calcium and/or magnesium) and carbon dioxide are added to the cooking solution, so that the pH lowers from the alkaline to the neutral range, or the pH remains on an essentially neutral level during the cooking. In the cooking, the starch granules are partly or fully broken.

F) A hydroxide solution (calcium and/or magnesium) and carbon dioxide are added to nanocellulose, CMC, or cold-soluble starch solution or a combination of any of the above, so that the pH lowers from alkaline to the neutral range or remains essentially neutral during the precipitation. By using the above-mentioned materials as the source of polysaccharide in the manufacturing method, according to the invention, it is possible to considerably increase the generation of the strength effect, most preferably, together by means of the carbonate filler that is precipitated from the acidic carbonate ion solution.

G) Nanocellulose, CMC, cold-soluble starch or the combination of any of the above is elutriated in the acidic carbonate ion solution and the pH is raised to neutral or alkaline by means of heating, the addition of an alkaline, low pressure, centrifugal force or a combination of any of the above.

In particular, the fibre product that is manufactured, possibly with the composite structure, contains chemical pulp and/or wood fibre and/or synthetic fibre and it is preferably paper or board; and the manufacturing method of this product, wherein the carbonate filler is attached between the chemical pulp fibres or wood fibres and to the fibrils, whereafter the said paper or board is produced from the pulp. In the present invention, the fibres can be any natural fibres and/or synthetic fibres. In particular, the fibres can be comprised of chemical pulp or mechanical pulp or a mixture thereof. For example, sulphate and sulphite cellulose fibres, dissolving pulp, nano-cellulose, chemi-mechanical (CTMP), thermo-mechanical (TMP), pressure groundwood (PWG), groundwood pulp, recycled fibre or the fibres of de-inked pulp, can constitute the solid matter. Typically, sulphate and sulphite celluloses are called chemical pulps, and thermo-mechanical pulp, pressure groundwood, and groundwood pulp are called mechanical pulps.

In addition to printing papers (SC, newsprint, fine papers etc.) and packing materials (folding board, linerboard, recycled board, etc.), tissue and kitchen papers are good applications, as in these products, the bursting strength is quite important. In the manufacture of corrugated board, the carbonate polysaccharide structure, according to the invention, can be used in sizing the fluting layer to the liner layer to provide an improved strength and stiffness between the layers. The recyclability of the carbonate polysaccharide seam is an advantage.

In the manufacture of gypsum boards, the back and surface structures and the core of the gypsum board are expected to have good strength properties. Generally, the surface and back structures are comprised of paper or board, and the tensile strength is a very important property of the gypsum board. The core structure generally consists of gypsum filler, wherein the starch functions as a cohesive binder. The core should have compression strength, in particular. Generally, when the gypsum board is dried, starch drifts towards the surface and back structures, improving their attachment to the gypsum core. In addition to the gypsum filler, the core structure can contain, for example, lime stone, fly ash or some recycled material. In addition to paper or board, the back and surface structures can also consist of non-woven materials, for example.

In the lamination of table tops and floor materials, so-called resin impregnated paper material (Deco papers) can be used, wherein calcium carbonate, kaolin, and titanium oxide are used as filler, for example. The binder may consist of starch, among others. This structure is expected to have an excellent printability and inner strength. It can further be laminated on top of a fibre board or chipboard, for example.

The following, non-limiting examples illustrate the invention and its advantages.

EXAMPLES

Example 1

A carbonate ion solution was prepared so that 28 or 56 g of burnt lime (CaO) was mixed with 1000 g of water at 55° C. The thus generated $Ca(OH)_2$— slurry was allowed to react with the carbon dioxide that was conducted thereto, so that the final pH was 6.2. The carbonate ion solution that was thus prepared was used as raw material in the precipitation tests, described below, either as the dilution water of the cooking of starch (cooking) or the dilution water of cooked starch (dilution).

Example 2

In this example, the carbonate ion solutions that were prepared according to the previous example were used as the cooking water of starch (Cooking) and the dilution water of the cooked starch (Dilution) (tap water being used as cooking water in the cooking), The test points are presented in table 1.

TABLE 1

Test points.

| Test point | Starch, kg/t | Description |
|---|---|---|
| A | 10 | Starch |
| B | 10 | Kaolin |
| C | 10 | Cooking |
| D | 10 | Dilution |

In all of the test points, starch was added to high-consistency chemical pulp (4.5%) in an amount of 10 kg/t. Starch was added at a temperature of about 70° C. and it was cooked in a content of 1%. The cationic pulp starch that was used in the tests was from Chemigate Oy (Raisamyl, the DS of which was 0.035).

Consequently, the more detailed descriptions of the test points are as follows:

in test point A (Starch), no filler was added to the pulp, only 10 kg/t of starch was added to the high-consistency pulp;

in test point B (Kaolin), kaolin (Capim SBF, Imerys) was added to the pulp with two different levels of filler, with a goal of obtaining about 5% and 15% of filler in the finished sheet, whereby kaolin was added to the sheet mould, and 10 kg/t of starch was added to the high-consistency pulp;

in test point C (Cooking), the acidic carbonate ion solutions that were prepared according to example 1 were used as the dilution water of the cooking of starch, whereby also in this test point, when 10 kg/t of starch was added to the high-consistency pulp, and along with the starch, two different levels of filler (5 and 15%) were obtained in the finished sheets;

in test point D (Dilution), the cooking of the 1% starch solution was completed, i.e., broken starch was provided (95° C., 30 minutes), and it was diluted with the carbonate ion solutions of 45° C. of example 1, so that the amount of starch that was added to the high-consistency pulp was always 10 kg/t, and two different levels of filler were obtained in the sheets.

In laboratory tests, pine pulp and birch pulp that were ground to an SR number of 25 were used. The portion of pine pulp in the pulp was 70% and that of birch pulp was 30%. The density of the pulp was 4.5%. From this pulp, 80 $g/m^2$ sheets were made by the sheet mould, using 200 g/t of polyacrylamide (PAM) as the retention agent (Percol 3045, BASF), which was dosed into the sheet mould. In the following results, the filler contents are normalized to a level of 10%.

Sheets of 80 $g/m^2$ were produced in the sheet mould without circulated water, according to the standards SCAN-C 26:76 (SCAN-M 5:76) (10 sheets in each test point). The basis weights of the sheets were at the target basis weight of 80 $g/m^2$, with an accuracy of ±0.6 $g/m^2$. Thereafter, the sheets were dried before they were taken to aerate for 48 hours at 23° C. and a relative humidity of 50%. Thereafter, their basis weights were verified and the following properties were determined:

Filler content (525° C. and 2 hours)

ISO brightness (Minolta Spectrophotometer 3610d), ISO 2470

Opacity (Minolta Spectrophotometer 3610d), ISO 2471

Z strength (L&W ZD tensile tester), TAPPI-UM403

TEA (Fracture Toughness), SCAN-P 38:80

Bursting strength (L&W bursting strength tester), TAPPI T403 OM-10

Porosity (Parker print surface), ISO 5636-3

Figure 1:
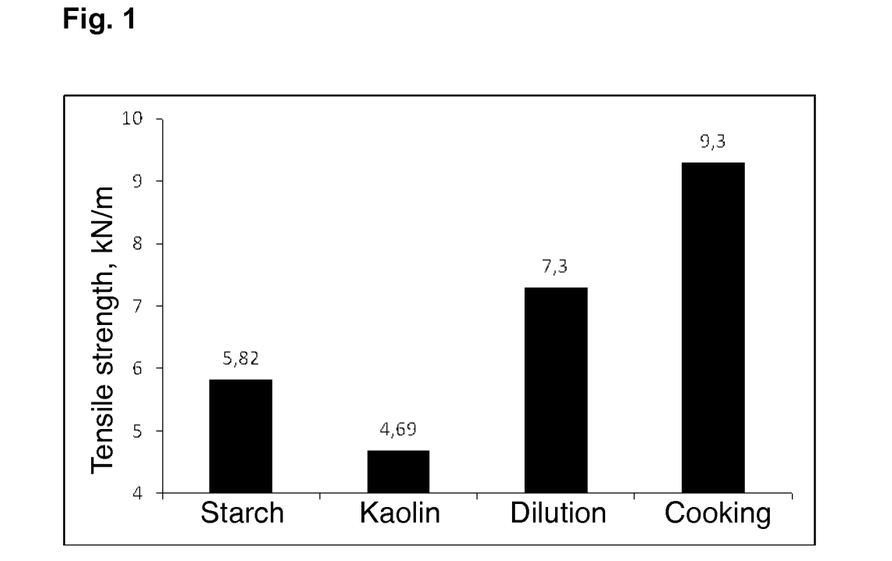
FIG. 1 shows the tensile strength of the fibre product according to the invention (80 g/m$^2$ sheets, 10% of carbonate, and 10 kg/t of starch).

FIG. 1 shows that, with the carbonate starch composite, the tensile strength can be increased to even higher than with starch only, even though there is no filler in the pulp in the Starch point.

Figure 2:
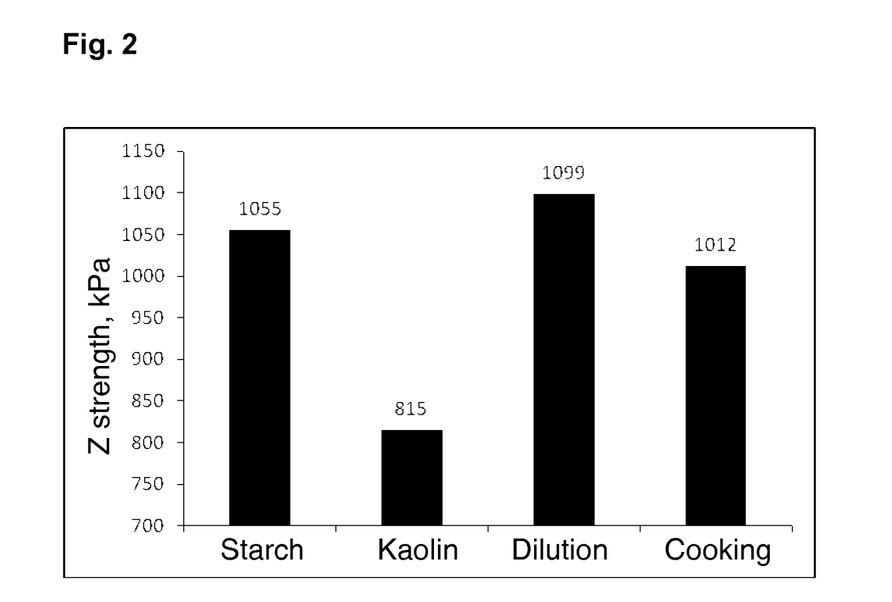
FIG. 2 shows the Z strength of the fibre product according to the invention (80 g/m$^2$ sheets, 10% of carbonate, and 10 kg/t of starch).

In the Z strength (FIG. 2), the strength level provided by starch is achieved (Starch).

Figure 3:
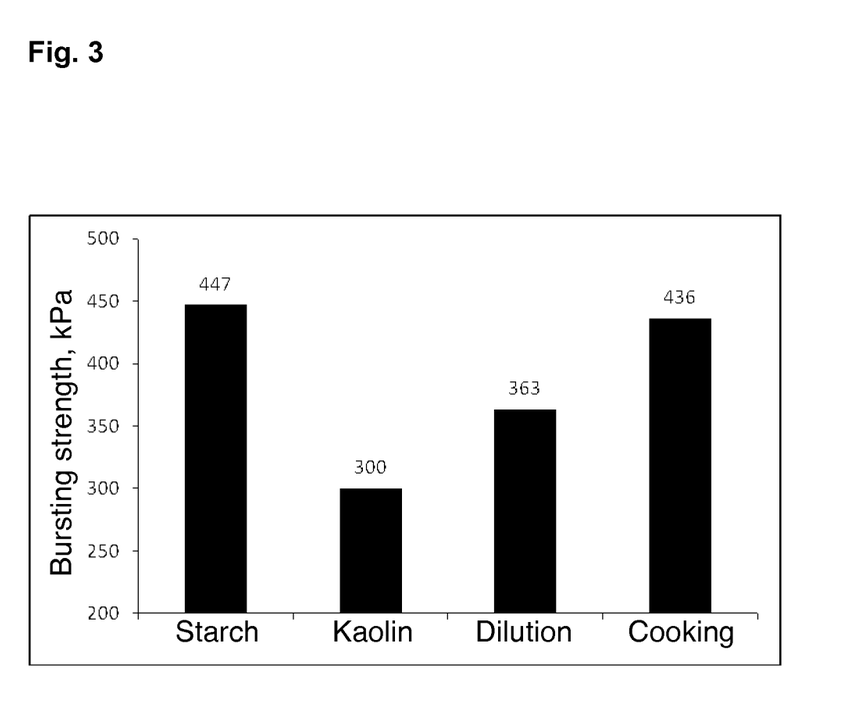
FIG. 3 shows the bursting strength of the fibre product according to the invention (80 g/m² sheets, 10% of carbonate, and 10 kg/t of starch).

In the bursting strength (FIG. 3), the strength level provided by starch is also achieved (Starch).

In all of the strength measurements, kaolin acts like the fillers at present do—weakening the strength level to what is achieved by starch and fibres without any filler in the pulp.

TABLE 2

Other measured values.

| | Brightness, % | Opacity, % | Elongation, % | Porosity, ml/min |
|---|---|---|---|---|
| Starch | 82.5 | 79.7 | 3.27 | 1556 |
| Kaolin | 83.2 | 83.7 | 2.66 | 2128 |
| Dilution | 85.4 | 84.9 | 3.30 | 2199 |
| Cooking | 84.4 | 86.9 | 4.04 | 1999 |

Table 2 shows that the carbonate starch composite, according to the invention, is obviously capable of increasing the brightness and opacity.

Figure 4:
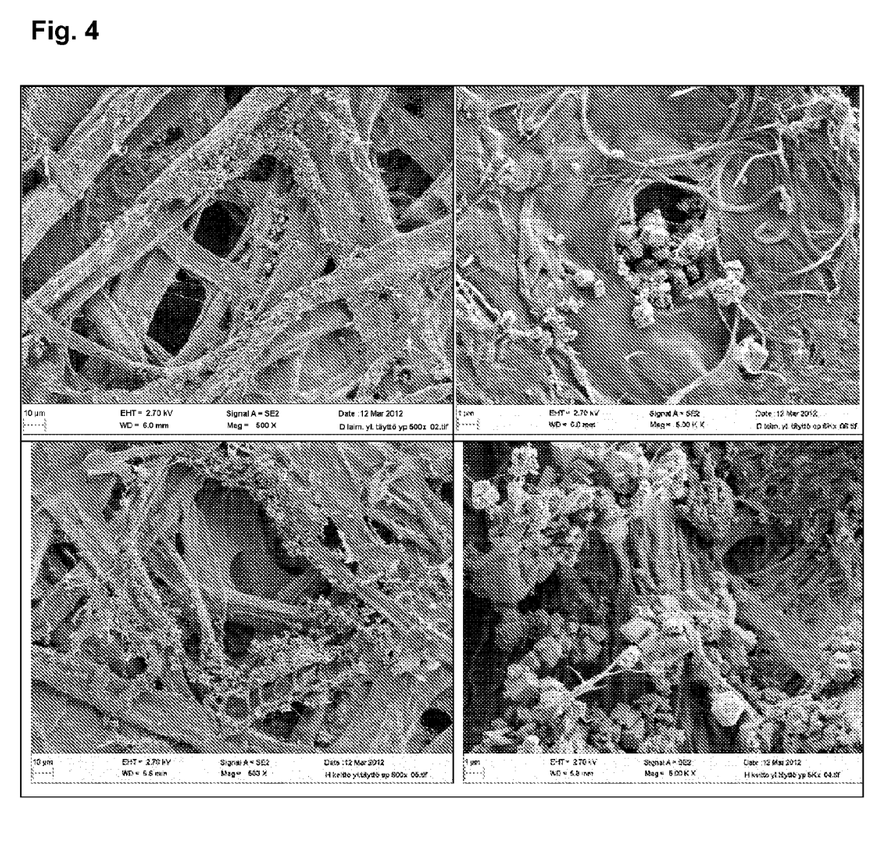
FIG. 4 shows the SEM images of the fibre product, wherein the carbonate starch composite according to the invention is attached to the surface of the fibres, whereby, in the upper row, there are images of composites that are obtained by dilution (Dilution) and, in the lower row, those obtained from the cooking stage (Cooking).

The SEM images of FIG. 4 show that the composite of the invention is not essentially agglomerated, but the cubic and flaky carbonate particles are rather attached to the starch as a banded structure.

Example 3

In this example, the carbonate ion solutions that were prepared, according to Example 1, were used as the cooking water of the cooking of starch (Cooking). The test points are presented in Table 3.

TABLE 3

Test points.

| Test point | Starch, kg/t | Description |
|---|---|---|
| A | 10 | Starch |
| B | 10 | PCC |
| C | 10 | Cooking |
| D | 10 | PCC&HV |
| E | 10 | PCC&Cooking |

In all of the test points, starch was added to high-consistency chemical pulp (4.5%) in amounts of 10 kg/t. Starch was always added at a temperature of about 70° C. and it was always cooked in a content of 1%. The cationic pulp starch that was used in the tests was from Chemigate Oy (Raisamyl, the DS of which was 0.035).

Consequently, the more detailed descriptions of the test points are as follows:

in test point A (Starch), no filler was added to the pulp, only 10 kg/t of starch was added to the high-consistency pulp;

in test point B (PCC), PCC (Opacarb A, Specialty Minerals) was added, with two different levels of filler, with a goal of obtaining about 5% and 15% of filler in the finished sheet, whereby the PCC was added to the sheet mould, and it was possible to add 10 kg/t of starch to the high-consistency pulp;

in test point C (Cooking), the acidic carbonate ion solutions that were prepared according to example 1 were used as cooking water in the cooking of starch, whereby also in this test point, 10 kg/t of starch was obtained in the high-consistency pulp and, and along with the starch, two different levels of filler (5 and 15%) were obtained in the finished sheets;

in test point D (PCC&HV), the cooking of the 1% starch solution was completed, breaking the starch (95° C., 30 minutes), the cooking water either comprising 5% of PCC and the carbonate ion solution of example 1 (28 g CaO/L) or 10% of PCC and the carbonate ion solution of example 1 (56 g CaO/L), whereby, this mixing ratio contained about half of the PCC and a half of the carbonate filler that was generated from the acidic carbonate ion solution, and the PCC and the carbonate ion solution were mixed together in an even mixture before this mixture was used as the cooking water of the 1% starch;

in test point E (PCC&Cooking), 5% or 15% of PCC was added to the 1% starch solution.

In laboratory tests, pine pulp and birch pulp that were ground to an SR number of 25 were used. The portion of pine pulp in the pulp was 70% and that of birch pulp was 30%. The density of the pulp was 4.5%. From this pulp, 80 g/m² sheets were made by the sheet mould, using 200 g/t of polyacrylamide (PAM) as the retention agent (Percol 3045, BASF), which was dosed into the sheet mould. In the following results, the filler contents are normalized to a level of 10%.

Sheets of 80 g/m² were produced in the sheet mould without circulated water, according to the standards SCAN-C 26:76 (SCAN-M 5:76) (10 sheets in each test point). The basis weights of the sheets were at the target basis weight of 80 g/m², with an accuracy of ±0.6 g/m². Thereafter, the sheets were dried before they were taken to aerate for 48 hours at 23° C. and a relative humidity of 50%. Thereafter, their basis weights were verified and the following properties were determined:

Filler content (525° C. and 2 hours)

ISO brightness (Minolta Spectrophotometer 3610d), ISO 2470

Opacity (Minolta Spectrophotometer 3610d), ISO 2471

Z strength (L&W ZD tensile tester), TAPPI-UM403

TEA (Fracture Toughness), SCAN-P 38:80

Bursting strength (L&W bursting strength tester), TAPPI T403 OM-10

Porosity (Parker print surface), ISO 5636-3

The assessment of the printing properties of the sheets in this test was made by measuring the density. The sheets were printed by the Universal Testprinter (Testprint B.V.), using a Cold set black (Sun Chemical, viscosity 7.3 Pas) with an amount of ink of 10 milligrams, on the upper surface of the sheet. The densities were measured by a densitometer (Macbeth) from aerated and dried samples after 24 hours from the printing. The Universial testprinter employed a pressure of 630N and a velocity of 1 m/s.

Figure 5:
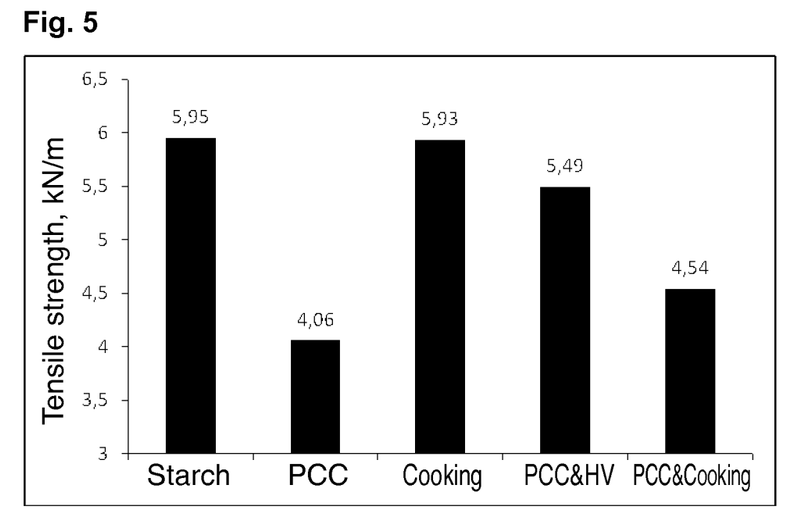
FIG. 5 shows the tensile strength of the fibre product according to the invention (80 g/m² sheets, 10% of carbonate, and 10 kg/t of starch).

FIG. 5 shows that the addition of PCC to the cooking stage of starch (PCC&Cooking) increases the tensile strength, compared with the adding of PCC to the fibre slush (PCC). At the cooking stage, the tensile strength can even be increased from the previous by using PCC together with the acidic carbonate ion solution. By using the acidic carbonate ion solution as the cooking water of starch (Cooking), however, the same level of tensile strength is achieved as with starch only (Starch).

Figure 6:
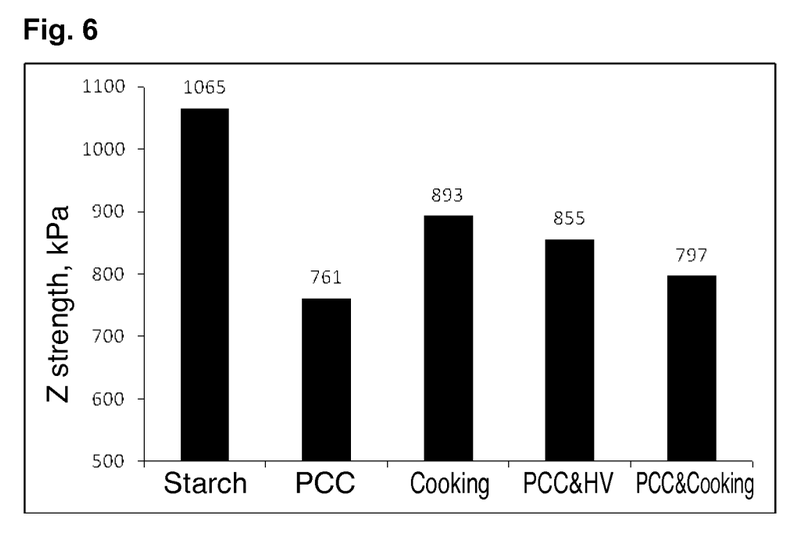
FIG. 6 shows the Z strength of the fibre product according to the invention (80 g/m² sheets, 10% of carbonate, and 10 kg/t of starch).

The same trend as in the previous FIG. 5 can also be observed in FIG. 6. By the uses according to the invention (Cooking, PCC&HV, and PCC&Cooking), a better Z strength is achieved than when PCC is added to the slush pulp (PCC).

Figure 7:
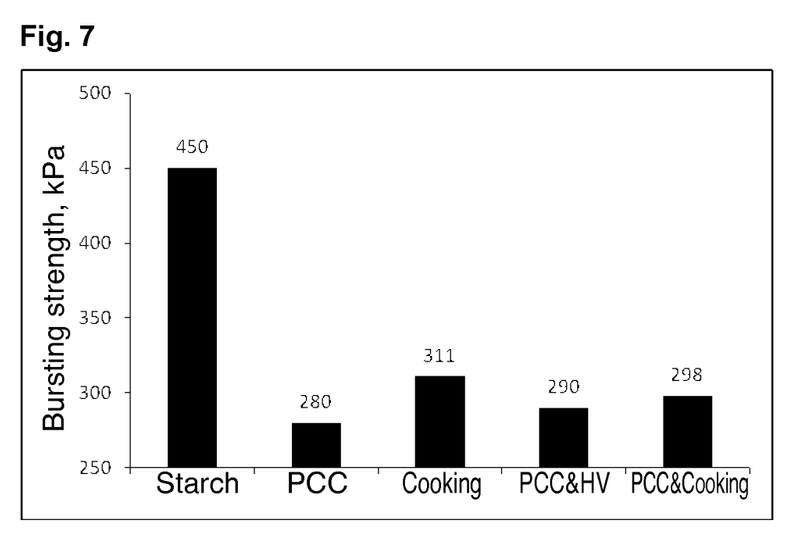
FIG. 7 shows the bursting strength of the fibre product according to the invention (80 g/m² sheets, 10% of carbonate, and 10 kg/t of starch).

Regarding the bursting strength (FIG. 7), the differences in the test points, according to the invention, are not as obvious as in the previous strengths, but also in this case, an improvement is achieved, compared with simply adding PCC to the slush pulp (the PCC test point).

TABLE 4

Other measured values.

| | Brightness, % | Opacity, % | Elongation, % | Porosity, ml/min | Optical density, 10 g |
|---|---|---|---|---|---|
| Starch | 82.7 | 79.6 | 3.26 | 1550 | 0.95 |
| PCC | 84.3 | 85.4 | 2.61 | 2497 | 1.42 |
| Cooking | 85.3 | 86.1 | 3.72 | 2673 | 1.95 |
| PCC&HV | 84.6 | 85.6 | 3.00 | 2483 | 1.86 |
| PCC&Cooking | 85.5 | 88.0 | 2.79 | 2373 | 1.63 |

Table 4 shows that, in particular, the brightness, opacity, and optical density (printability) are on a better level, when the solutions according to the invention are used, than in test point PCC.

Example 4

This example shows how the grinding of chemical pulp influences the dry strength.

In laboratory tests, chemical birch pulp that was ground to the SR numbers of 20 and 35 (Valley Hollander) was used. The density of the pulp was 3.6%. From this pulp, 80 g/m$^2$ sheets were made by the sheet mould, using 400 g/t of polyacrylamide (PAM) as the retention agent (Percol 3045, BASF), which was dosed into the sheet mould. In the following results, the filler contents are normalized to a level of 10%.

Sheets of 80 g/m$^2$ were produced in the sheet mould without circulated water, according to the standards SCAN-C 26:76 (SCAN-M 5:76) (10 sheets in each test point). The basis weights of the sheets were at the target basis weight of 80 g/m$^2$, with an accuracy of ±0.6 g/m$^2$. Thereafter, the sheets were wet-pressed and dried before they were taken to aerate for 48 hours at 23° C. and a relative humidity of 50%. Thereafter, their basis weights were verified and the following properties were determined:

Filler content (525° C. and 2 hours)
ISO brightness (Minolta Spectrophotometer 3610d), ISO 2470
Opacity (Minolta Spectrophotometer 3610d), ISO 2471
Z strength (L&W ZD tensile tester), TAPPI-UM403
TEA (Fracture Toughness), SCAN-P 38:80
Bursting strength (L&W bursting strength tester), TAPPI T403 OM-10
Porosity (Parker print surface), ISO 5636-3

The test points are presented in Table 5.

TABLE 5

Test points.

| Test point | Starch, kg/t | SR number | Description |
|---|---|---|---|
| A | 10 | 20 | PCC1 |
| B | 10 | 20 | Cooking1 |
| C | 10 | 35 | PCC2 |
| D | 10 | 35 | Cooking2 |
| E | 10 | 20 | Starch1 |
| F | 10 | 35 | Starch2 |

In all of the test points, starch was added to high-consistency chemical pulp (3.6%) in an amount of 10 kg/t. Starch was added at a temperature of about 70° C. and it was cooked in a content of 1%. The cationic pulp starch that was used in the tests was from Chemigate Oy (Raisamyl, the DS of which was 0.035).

Consequently, the more detailed descriptions of the test points are as follows:

in test points E and F (Starch1 and Starch2), no filler, only 10 kg/t of starch was added to the high-consistency pulp;

in test points A and C (PCC1 and PCC2), PCC (Opacarb A, Specialty Minerals) was added, with two different levels of filler, with a goal of obtaining about 5% and 15% of filler in the finished sheet, whereby the PCC was added to the sheet mould, and it was possible to add 10 kg/t of starch to the high-consistency pulp;

in test points B and D (Cooking1 and Cooking2), the acidic carbonate ion solutions that were prepared according to Example 1 were used as the cooking water in the cooking of starch, whereby also from this test point, it was possible to add 10 kg/t of starch to the high-consistency pulp and, along with the starch, two different levels of filler (5 and 10%) were obtained in the finished sheets in each test point.

TABLE 6

Strength values.

| Test point | Tensile strength, kN/m | Z strength, kPa | Bursting strength, kPa |
|---|---|---|---|
| | SR number 20 | | |
| A | 3.1 | 594 | 233 |
| B | 3.8 | 700 | 250 |
| E | 5.22 | 760 | 365 |
| | SR number 35 | | |
| C | 4.79 | 720 | 322 |
| D | 4.84 | 854 | 407 |
| F | 6.34 | 831 | 465 |

Table 6 shows the strength values for the different test points. The results are grouped in two groups, according to the degree of grinding. The grinding of pulp obviously increases all of the strength values. With a higher degree of grinding, it can be observed that, in connection with the cooking of starch (test point D), the acidic carbonate ion solution gives even a better Z strength than the control point F that was made without the filler. With both degrees of grinding, higher strength values are achieved, when the acidic carbonate ion solution is used as the cooking water in the cooking of starch, than when starch is added to the high-consistency pulp PCC filler slush.

TABLE 7

Other measured values.

| Test point | Brightness, % | Opacity, % | Porosity, ml/min | Elongation, % |
|---|---|---|---|---|
| A | 84.7 | 84.2 | 3432 | 2.59 |
| B | 85.5 | 86.6 | 4461 | 3.10 |
| C | 84.8 | 84.6 | 924 | 3.23 |
| D | 85.4 | 85.6 | 1264 | 3.24 |
| E | 82.5 | 80.5 | 2230 | 3.44 |
| F | 81.9 | 79.8 | 563 | 4.23 |

Table 7 shows that the opacity and brightness values are better in the test points, according to the invention (test points B and D), than in the test points that use PCC (test points A and C), or in the test points that use starch only (test points E and F), regardless of the degree of grinding. In addition to the strengths, the joint use of the grinding and the carbonate polysaccharide structure, according to the invention, can also have a positive effect on the decrease in porosity, due to the inclusion of grinding.

While the present invention has been illustrated and described with respect to a particular embodiment thereof, it should be appreciated by those of ordinary skill in the art that various modifications to this invention may be made without departing from the spirit and scope of the present.

What is claimed is:

1. A method of producing a composite structure, which is formed of starch, on which carbonate is precipitated, consisting of:
   forming a carbonate ion solution;
   mixing starch, in a form having free hydroxyl groups on its surface, into the carbonate ion solution, whereby a carbonate starch slurry is formed; and
   precipitating carbonate salt from the slurry into the starch.

2. The method according to claim 1, wherein the carbonate ion solution is formed from calcium or magnesium ions or a combination thereof, bicarbonate, and other states of carbonate from the hydroxide solution thereof by conducting carbon dioxide to the hydroxide solution.

3. The method according to claim 2, wherein the hydroxide solution is prepared by elutriating, in water, burnt lime, burnt dolomite, MgO, or another source of calcium or magnesium which, when elutriated in water, provides an alkaline solution, or a mixture of two or more of the above.

4. The method according to claim 1, wherein the starch is starch particles prepared by cooking either by batch cooking, whereby the cooking temperature is about 95° C., or by means of a jet cooker, whereby the cooking temperature is within 125-135° C.

5. The method according to claim 4, wherein the cooking is carried out so that the cooked starch particles are partly or fully broken, whereby starch polymers come off the structure of the particles; or
   a quick heating is carried out and, thereafter, a quick cooling, whereby the starch particles swell, maintaining their shape.

6. The method according to claim 4, wherein:
   the carbonate ion solution is prepared by conducting carbon dioxide to the solution until the pH of the solution is below 6.5; and
   the carbonate salt is precipitated from the slurry onto the starch by adjusting the pH of the slurry to higher than 6.5 by means of heating, low pressure, agitation or a combination thereof, whereby carbon dioxide is released and the carbonate salt precipitates on the starch.

7. The method according to claim 1, wherein carbonate is precipitated on the starch by changing the pH from alkaline towards neutral by addition of carbon dioxide to the carbonate starch slurry.

8. The method according to claim 7, wherein the addition of carbon dioxide is regulated so that the pH of the carbonate starch slurry remains within a range of 6.5-8 throughout the precipitation of the carbonate salt.

9. A method of producing a composite structure, which is formed of starch particles, on which carbonate is precipitated, consisting of:
   forming a carbonate ion solution;
   mixing starch particles, in a form having free hydroxyl groups on its surface, into the carbonate ion solution, whereby a carbonate starch particle slurry is formed;
   heating the carbonate starch particle slurry by batch cooking at a cooking temperature of about 95° C. or by means of a jet cooker at a cooking temperature of 125-135° C.; and
   precipitating carbonate salt from the slurry into the starch particles.

10. The method according to claim 9, wherein the cooking is carried out so that the cooked starch particles are partly or fully broken, whereby starch polymers come off the structure of the particles; or a quick heating is carried out and, thereafter, a quick cooling, whereby the starch particles swell, maintaining their shape.

11. The method according to claim 9, wherein:
    the carbonate ion solution is prepared by conducting carbon dioxide to the solution until the pH of the solution is below 6.5; and the carbonate salt is precipitated from the slurry onto the starch particles by adjusting the pH of the slurry to higher than 6.5 by means of heating, low pressure, agitation or a combination thereof, whereby carbon dioxide is released and the carbonate salt precipitates on the starch particles.

12. The method according to claim 9, wherein carbonate is precipitated on the starch by changing the pH from alkaline towards neutral by addition of carbon dioxide to the carbonate slurry.

13. The method according to claim 12, wherein the addition of carbon dioxide is regulated so that the pH of the carbonate slurry remains within a range of 6.5-8 throughout the precipitation of the carbonate salt on the starch particles.

14. A method of producing a composite structure, which is formed of starch particles, on which carbonate is precipitated, consisting of:
    forming a carbonate ion solution;
    mixing starch particles, in a form having free hydroxyl groups on its surface, into the carbonate ion solution, whereby a carbonate starch particle slurry is formed;
    precipitating carbonate salt from the slurry into the starch particles; and
    heating the carbonate starch particle slurry in which carbonate salt has been precipitated into the starch particles by batch cooking at a cooking temperature of about 95° C. or by means of a jet cooker at a cooking temperature of 125-135° C.

15. The method according to claim 14, wherein the cooking is carried out so that the cooked starch particles are partly or fully broken, whereby starch polymers come off the structure of the particles; or
    a quick heating is carried out and, thereafter, a quick cooling, whereby the starch particles swell, maintaining their shape.

16. The method according to claim 14, wherein:
    the carbonate ion solution is prepared by conducting carbon dioxide to the solution until the pH of the solution is below 6.5; and
    the carbonate salt is precipitated from the slurry onto the starch particles by adjusting the pH of the slurry to higher than 6.5 by means of heating, low pressure, agitation or a combination thereof, whereby carbon dioxide is released and the carbonate salt precipitates on the starch particles.

17. The method according to claim 14, wherein carbonate is precipitated on the starch particles by changing the pH from alkaline towards neutral by addition of carbon dioxide to the carbonate slurry.

18. The method according to claim 17, wherein the addition of carbon dioxide is regulated so that the pH of the carbonate slurry remains within a range of 6.5-8 throughout the precipitation of the carbonate salt on the starch particles.

* * * * *